W. MAREAN.
CAR BRAKE AND STARTER.
No. 194,450. Patented Aug. 21, 1877.
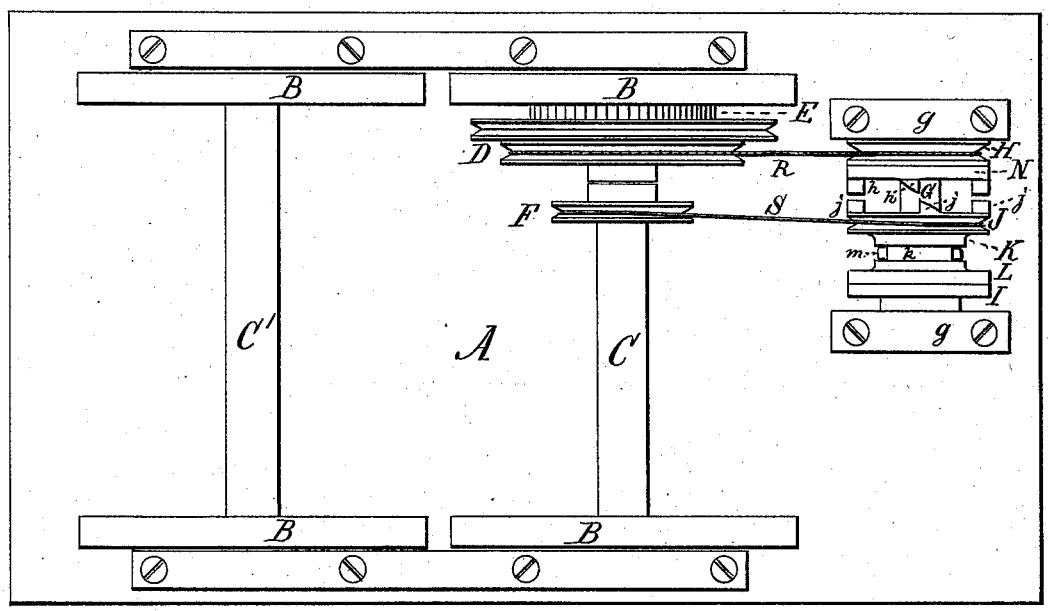
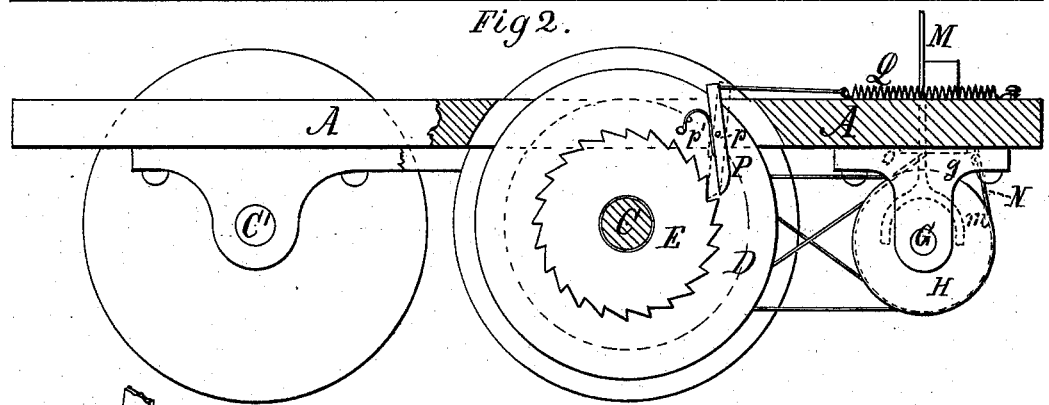
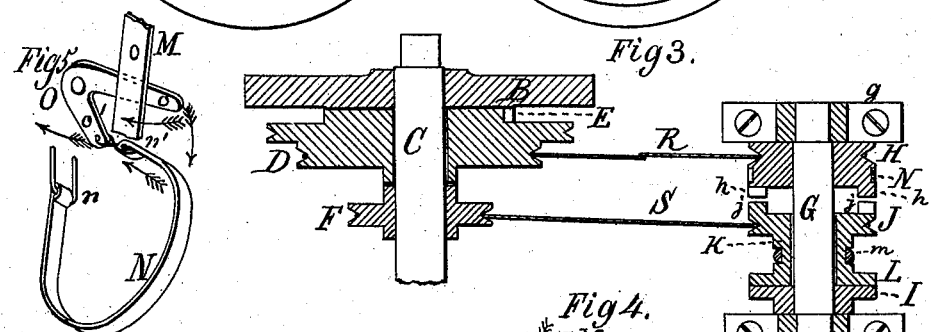
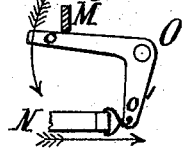

UNITED STATES PATENT OFFICE.

WILLIAM MAREAN, OF GALVESTON, TEXAS.

IMPROVEMENT IN CAR BRAKE AND STARTER.

Specification forming part of Letters Patent No. 194,450, dated August 21, 1877; application filed July 24, 1877.

*To all whom it may concern:*

Be it known that I, WILLIAM MAREAN, of the city and county of Galveston, and State of Texas, have invented a new and useful Improvement in Car-Brakes, which improvement is fully set forth in the following specification and accompanying drawings, in which latter—

Figure 1 is a bottom view of a car provided with my improved car-brake. Fig. 2 is a side view of the lower part of a car having the said improved car-brake, for the better exhibition of which a part of the car is broken away and sectioned. Fig. 3 is a central horizontal section of my improved car-brake attached to one of the car-axles. Fig. 4 is a detailed view of the lever-motion used for operating a band-brake. Fig. 5 is a perspective view of the same.

The nature of my invention consists in certain constructions, combinations, and arrangements of parts hereinafter fully described and specifically claimed, whereby a car-brake of novel and simple construction is produced.

In Figs. 1 and 2, A denotes the bottom of a car, B the wheels, and C C' their axles. One of the axles C has a chain-pulley, D, and ratchet-wheel E—constructed either in one piece or fastened together—loosely fitted on it and a chain-pulley, F, fastened to it. For convenience in construction, I place the parts D E between one of the wheels B and the chain-pulley F. Near the said axle C, and parallel with it, a shaft, G, is hung by means of hangers $g$ fastened to the car-bottom. The said shaft G has a chain-pulley, H, and a friction-disk, I, fastened upon it. Between the chain-pulley H and friction-disk I a chain-pulley, J, is loosely fitted, which by means of a grooved sleeve, K, is connected with a friction-disk, L. The said parts J K L are so placed between the parts H and I that they may be shifted longitudinally, which is done by means of a forked shifting-lever, M, which has its fulcrum in the car-bottom, and has its lower forked end $m$ lodged in the groove $k$ of the sleeve K.

The chain-pulleys H and J are provided with opposing clutch-faces, the clutch-teeth $h$ and $j$ of which serve, when engaged by means of the lever M, to clutch the said pulleys when the car moves forward, but slide over each other when the car is backing. The chain-pulley H has upon one of its rims a metal band, N, one end $n$ of which is fastened to the car-bottom, and the other end $n'$ of which is attached to the arm $o$ of bell-crank lever O, which has its fulcrum on the car-bottom. The other arm $o'$ of the lever O is operated by the lever M when the clutch-teeth $h$ and $j$ are brought together to their full depth; otherwise the lever O is not in contact with the lever M, and the band N lies loosely around the rim of the chain-pulley H. The chain-pulley D is provided on its outer face with a lever-pawl, P, which has its fulcrum $p$ on the said pulley, and which, by means of a spring, $p'$, is kept out of gear with the ratchet-wheel E. The upper end of the lever-pawl P is connected with a spring, Q, which is fastened to the car-bottom. The chain-pulleys D and H are connected by means of a crossed chain, R, and the chain-pulleys F and J are connected by a straight continuous chain, S.

While the car is running at the usual speed the lever M is held or fastened in such position that neither the clutch-teeth $h$ and $j$, nor the friction-disks I and L, are engaged. The chain-pulley J revolves in the same direction as the chain-pulley F and the car-wheel B, and the chain-pulleys D and H stand still.

When the car runs down an incline, and speed requires to be retarded, the lever M is so moved as to bring the disks I and L in contact, as seen in Fig. 3. The disk I now revolves with the disk L by means of the facial friction between it and disk L, and thereby revolves the shaft G and chain-pulley H. The chain-pulley H now revolves the pulley D, by means of the crossed chain S, in the opposite direction. The pawl-lever P, being thereby moved from its normal position, increases the tension of the spring Q, and the said pawl is thereby moved in gear with the ratchet-wheel E, and the spring is thus wound up by the revolution of the chain-pulley D until its tension overcomes the friction between the disks I and L, and they slide against each other. This operation counteracts excessive speed of the car, and by compressing more or less the disks I and L the speed of the car may be regulated at will. By relieving the said disks I and L the spring Q resumes its original shape and tension by pulling the lever-pawl P back to its normal position.

The power exerted by the unwinding-spring upon the car-axle, may be used to assist the car in starting. The described operation is also adaptable to the stoppage of the car in ordinary cases; but when absolute stoppage on an inclined part of the road, or during high speed of the car, is desired, this operation is insecure. Then, by moving the lever M in the opposite direction the operator engages the clutch-teeth $h$ and $j$, thereby causing the chain-pulley D to revolve, as before stated, in the opposite direction of the revolving car-wheel, winding up the spring Q by means of the pawl P. To keep the wound-up spring from being overstrained, the lever M is moved farther in the said direction, whereby it comes in contact with the arm $o$ of the lever O, and, by swinging the same out of its normal position, causes the other arm, $o'$, to draw the band N tight around the chain-pulley H, thus stopping the car. By moving the lever M back to its normal position the band N will become loose upon the chain-pulley H and the spring Q resume its normal shape and tension, and thereby turn the chain-pulleys D H and the disk I in the opposite direction without moving the car backward.

In backing the car the ratchet-wheel E and pawl P do not become engaged, as the spring $j$ keeps the pawl out of range of the ratchet-teeth.

Having described my invention, what I claim as new, and desire to secure by Letters Patent, is—

1. The combination of a car-axle, C, having the pulleys D and F, the shaft G having the pulleys H and J and friction-disks I and L, the connections R and S, and the spring Q, whereby a partially-yielding car-brake is produced, substantially as set forth.

2. In a car-brake the combination of the shifting-lever M and the lever O, whereby the within-described yielding brake-gear is converted into an unyielding brake, substantially as set forth.

3. The combination of the band-brake H N O, the car-axle C and connections D R, whereby the car is fully stopped, substantially as set forth.

Witness my hand in the matter of my application for a patent for a car-brake.

WILLIAM MAREAN.

Witnesses:
H. T. RIVERS,
WM. H. SINCLAIR.